(12) United States Patent
Gimenez et al.

(10) Patent No.: US 10,209,109 B2
(45) Date of Patent: Feb. 19, 2019

(54) NUCLEAR FLOWMETER FOR MEASUREMENTS IN MULTIPHASE FLOWS

(71) Applicants: Juan Bautista Emanuel Gimenez, San Carlos de Bariloche (AR); Miguel Ángel Nicolás Gimenez, San Carlos de Bariloche (AR)

(72) Inventors: Juan Bautista Emanuel Gimenez, San Carlos de Bariloche (AR); Miguel Ángel Nicolás Gimenez, San Carlos de Bariloche (AR)

( * ) Notice: Subject to any disclaimer, the term of this patent is extended or adjusted under 35 U.S.C. 154(b) by 0 days.

(21) Appl. No.: 15/717,672

(22) Filed: Sep. 27, 2017

(65) Prior Publication Data
US 2018/0156648 A1    Jun. 7, 2018

(30) Foreign Application Priority Data
Dec. 5, 2016   (AR) ............................... P2016013727

(51) Int. Cl.
G01F 1/44        (2006.01)
G01T 3/00        (2006.01)
(Continued)

(52) U.S. Cl.
CPC .................. *G01F 1/44* (2013.01); *G01F 1/74* (2013.01); *G01F 15/08* (2013.01); *G01T 3/00* (2013.01)

(58) Field of Classification Search
CPC ... G01F 1/44; G01F 1/74; G01F 1/704; G21C 17/10; E21B 43/24
See application file for complete search history.

(56) References Cited

U.S. PATENT DOCUMENTS 4,319,959 A * 3/1982 Monta .................... G21C 17/10
                                                    376/216
4,776,210 A * 10/1988 Baillie .................. E21B 49/086
                                                     73/61.47
(Continued)

FOREIGN PATENT DOCUMENTS

EP    2551648 A1    1/2013

OTHER PUBLICATIONS

Corneliussen,"Handbook of Multiphase Flow Metering Revision 2." The Norwegian Society for Oil and Gas Measurement and The Norwegian Society of Chartered Technical and Scientific Professionals ISBN 82-91341-89-3 Mar. 1, 2005.

*Primary Examiner* — Jewel V Dowtin
(74) *Attorney, Agent, or Firm* — Henry J. Cittone; Cittone Demers & Arneri LLP

(57) ABSTRACT

A nuclear flowmeter for measurements in multiphase flows consisting of up to three main phases that is connected in series in the output flow in a production line of an oil well, that includes a "U" shaped arrangement formed by an input branch and an output branch placed at both sides of the "U" shaped arrangement, where the input branch is connected to the production line of the oil well through an input pipe section (1) and the output branch is connected to the line of production of the oil well through an output pipe section (21) placed respectively at both ends of the "U" shaped arrangement; the input branch includes a pipe section with section reduction that forms a Venturi (3) while in the output branch includes a pipe section with possible section reduction (5) where the nuclear measurements are made, is provided.

20 Claims, 10 Drawing Sheets

(51) Int. Cl.
  *G01F 1/74* (2006.01)
  *G01F 15/08* (2006.01)

(56) References Cited

U.S. PATENT DOCUMENTS

| | | | |
|---|---|---|---|
| 4,825,072 A | | 4/1989 | McWhirter |
| 4,856,344 A | | 8/1989 | Hunt |
| 5,141,710 A | * | 8/1992 | Stirn ........................ G21C 7/32 |
| | | | 376/254 |
| 5,390,547 A | * | 2/1995 | Liu ........................... G01F 1/74 |
| | | | 73/200 |
| 5,543,617 A | | 8/1996 | Roscoe |
| 5,591,922 A | * | 1/1997 | Segeral ..................... G01F 1/36 |
| | | | 73/861.04 |
| 6,006,832 A | * | 12/1999 | Tubel ....................... E21B 23/03 |
| | | | 166/113 |
| 8,047,285 B1 | * | 11/2011 | Smith ....................... E21B 4/02 |
| | | | 166/260 |
| 2014/0105346 A1 | * | 4/2014 | Ohsaka ................ G21C 17/108 |
| | | | 376/254 |

\* cited by examiner

View:
Cross section

NUCLEAR FLOWMETER FOR MEASUREMENTS IN MULTIPHASE FLOWS

CROSS-REFERENCE TO RELATED APPLICATION

This application claims priority to Argentinean Patent App. No. P 20160103727, filed Dec. 5, 2016, the disclosure of which is hereby incorporated by reference in its entirety.

FIELD OF THE INVENTION

This invention refers to a flowmeter for measurements in multiphase flows consisting of up to three main phases, being able to quantify the volumetric fraction of each of them according to the moderation of neutrons generated in a portable and sealed source. The calculation of the total mass and volumetric flow is completed with measurements of pressure drop in a section of the "Venturi" tube and measurements of temperature and pressure of the system. The invention is directed to fluids with mainly high hydrogen and carbon content, as hydrocarbons and water. In order to improve the precision at high gas contents, a radiation chamber may be used to examine liquid samples acquired from a dedicated sample collection system.

BACKGROUND OF THE INVENTION

As it is well known, the production in the oil wells generates an oil flow mixed with water (either of injection for secondary recovery, or as emerging water) and gas (mainly methane). The presence of gas shall depend on the particular type of basin and well, but for the practical purposes of the neutron radiation, they represent an "empty" volume and do not contribute to the proceeding. The flow drags salts, mud and other suspended particles, that are not considered a "phase" in themselves due to their relatively low concentration.

The problem of a multiphase flow lies in that there are relative speeds between the phases, as well as a volumetric fraction for each of them, what makes it necessary to have information regarding some of these aspects to know the total mass and volumetric rate. In the oil production in particular, there exists a maximum "water cut" (volumetric fraction of water mixed with oil) to justify crude oil extraction, close to 98%. In these cases, the oil is transported as emulsion over the water phase and there are no relative speeds.

If the system presents a gaseous component, the complexity increases since this phase is compressible and the volumetric flow may vary hundreds of times between wells. The flow pattern in a mixture of gaseous and liquid phases shall also depend on the relative speeds between them as well as on the volumetric fraction that each of them occupies.

Consequently, in order to quantify the production in "wellhead" it is necessary to determine the amount of gas, water and oil that circulate, for the pressure and temperature conditions at which the station works. This allows extending the useful life of the well since it provides the producing company with the information necessary for the optimal management of the well.

This current state of the art allows measuring in a precise manner flows of single-phase systems, and also two-phase systems, using correction tables. However, these methods are inaccurate and highly dependent on the conditions in which these tables were obtained. For three-phase systems there are flowmeters based on Gamma radiation sources. Other technological alternatives to determine the volumetric fraction of the phases consist on ultra-sound, capacity impedance, among others.

The present invention solves above-mentioned problems using conventional measurements of pressure drop in restrictions to calculate the total flow and nuclear measurements. These last ones are based on placing a portable neutron source (of the Am—Be type sealed in stainless steel) in the proximity of a pipe section, the radiation interacts with the fluids and as a result a neutrons field of distinctive characteristics is generated, which can be quantified with a specific detection bench (gaseous detectors, of the proportional counter type).

The suggested technique is called "neutron interrogation" and allows measuring variations in the composition of each chemical element present in the mixture, with special sensitivity to the presence of "moderator" elements such as, mainly, carbon and hydrogen. Therefore, when the flow has variations in the water cuts as well as in the gas flow, the detected calculation of neutrons shall change in an approximately proportional manner.

Based on the calibration curves, for known pressure and temperature conditions and a defined geometry it is possible to contrast the measurements of the detectors to determine the volumetric fraction of each phase. The devise has a section where a "Venturi" restriction was implemented, which generates a pressure loss that accounts for the total volumetric flow that circulates trough the conduct. Consequently, the invention allows the measurement in an efficient and unambiguous manner of the total mass and volumetric flow, as well as of the partial corresponding to each constituent phase.

The patent documents U.S. Pat. No. 4,856,344 and 5,591, 922 describe devises for measurement of multiphase flow speed of the Gradio-Venturi type which through measurements of differential pressures distributed along the device, provide information relative to the flow speeds of the phases. In both patents, the Bernoulli principle is used to associate the pressure drop (either in the throat of Venturi type section or pipes of constant section) to calculate both the volumetric fraction that each phase occupies as well as the total flow. To do so, pressure drop measurements adequately combined are used (Venturi consecutive sections or measurements of pressure drop due to friction) being this the inventive contribution in each case. As a difference with the filed invention, where the Venturi section is used as support based on the data obtained from the measurements of neutron radiation detectors; that is to say, once the vacuum and water cut of the mixture are known. Therefore, the utility given to the measurement in Venturi is equivalent to the conventional measurements in single-phase flows.

The patent documents U.S. Pat. No. 5,543,617 and 4,825, 072 refer to a method for measurement of flow speeds using techniques that include radioactive tracers; the method includes injecting in the flow a non-radioactive tracer that has a transversal section for neutrons capture bigger than the one of the fluid which flow is desired to be measured, the introduction of the tracer that can be a Gadolinium composition is introduced upstream of a pulsed source that generates neutrons that radiates the fluid; the measurement of the Gamma rays induced by capture of neutrons, may be made with a scintillation detector and based on this measurement determine the correlation with the flow speed. The differences of said documents regarding the proposed device consist in the following three items: discrimination method, perturbation over the flow and radiation source used.

The discrimination of the phase is made when analyzing the moderation capacity of the multiphase mixture. When changing the relation of the phases a change in the pipe leakage spectrum is detected, that is proportional to the presence of gas, water and oil. The dependence with the phases' content is not only energetic but also directional. To take advantage of said effect there are neutron detectors calibrated in different range of energy in transmission and reflection positions regarding the issuing source.

On the other hand, as it dispenses of tracers, it is not necessary to consider the effect of the perturbations in the circulation pattern. In this manner the mixture of fluids is analyzed without modifications in its pattern.

The type of source used is different from the prior models. A fixed source is used (isotopic) of constant issuance instead of a pulsed issuer. In this manner the discrimination in energetic efficiency of the detectors (fast and thermal) and in efficiency due to angular position regarding the source is used to quantify the water cut and gas fraction in the mixture.

The European patent application EP 2551648 A1 refers to an apparatus for the measurement of a flow speed of a multiphase fluid sample that includes at least a gaseous phase and a liquid phase, where the apparatus includes a multiphase flowmeter; said device is formed by a pipe section through which the mixture of multiphase fluid enters to a measurement section that estimates a representative fraction of at least one of the gaseous phase and the liquid phase; a device of the mixture of multiphase fluid that passes through the measurement section; where the multiphase flowmeter further includes a reference measurement apparatus coupled to said multiphase flowmeter to provide in the place a measurement of the composition of an extracted sample, the flowmeter of this antecedent uses a Gamma source instead of the neutron source used by the present invention.

The physical principle used to quantify the volumetric fraction of the liquid and gaseous phases is different. In the present invention the phenomenon of "moderation" of fast neutrons within a media with low absorptions is used; being the main advantage the high degree of sensitivity to the presence of water and hydrocarbons. In invention EP 2551648 A1 the phenomenon of Gamma photons attenuation, in particular of an isotopic source of Bario-133, is used. As can be consulted in the open literature (Handbook of MultiphaseFlowMetering, Revision 2, March 2005, Norway. ISBN 82-91341-89-3), the source produces Gamma photons of two specific energies that are attenuated when passing through the conduct and the multiphase mixture. The corresponding detectors register the counting in the energies of interest and in this way the proportion between each present phase is calculated. The Gamma radiation is attenuated with better efficiency with higher atomic number of the nuclei of the present atoms: preferably with the steel of the conduct and structures and with lower probability in the nuclei of hydrogen and carbon that are intended to be detected. In this sense the neutron radiation presents an inherent advantage for these measurements, not being responsiveness to the surrounding structures but with high degree of response before changes in the amount of water, oil or gas.

SUMMARY OF THE INVENTION

This invention refers to a nuclear flowmeter for measurements in multiphase flows consisting of up to three main phases, being able to quantify the volumetric fraction of each one based on the moderation of neutrons generated in a portable and sealed source.

A nuclear flowmeter for measurements in multiphase flows consisting of up to three main phases that is connected in series in the output flow in a production line in an oil well, that includes a "U" shaped arrangement formed by an input branch and an output branch placed at both sides of the "U" shaped arrangement, where the input branch is connected to the production line of the oil well through an input pipe section (1) and the output branch is connected to the same line of production of the oil well through an output pipe section (21) placed respectively at both ends of the "U" shaped arrangement; the input branch includes a pipe section with section reduction that forms a Venturi (3) while in the output branch includes a pipe section with possible section reduction (5) where the nuclear measurements are made.

In the nuclear flowmeter for measurements in multiphase flows consisting of up to three main phases that is connected in series to a production line of an oil well of the above-mentioned, the input branch includes temperature and pressure sensors with the corresponding transducers (7) and a differential pressure transducer (10) to recollect pressure temperature and output flow pressure drop data in a production line of an oil well.

In said nuclear flowmeter for measurements in multiphase flows consisting of up to three main phases that is connected in series to a production line of an oil well, the pipe section (5) of the output branch is placed between a storage, shield and transport compartment of a neutron source (15) that includes said neutron source (17) and detectors of neutrons included in the respective supports (8).

In above flowmeter, the storage, shield and transport compartment of a neutron source (15) is externally coupled to the pipe sector with section reduction (5) of the output branch through an aluminum/stainless steel support (19) that allows the accommodation of said neutrons source (17) in its normal operation position.

In the nuclear flowmeter for measurements in multiphase flows consisting of up to three main phases that is connected in series to a production line in an oil well according to what has been previously stated, said neutron detectors included in said respective supports (8) are isolated through acoustic and thermal isolation (6).

In said nuclear flowmeter for measurements in multiphase flows consisting of up to three main phases that is connected in series to a production line of an oil well, said neutron detectors included in the respective supports (8) and isolated through said acoustic and thermal isolation (6) are connected to a signal conditioning and processing system (11) through output connectors (9) thereof which allows the signal conditioning and processing.

In the nuclear flowmeter for measurements in multiphase flows consisting of up to three main phases that is connected in series to a production line of an oil well, the data of pressure temperature and pressure drop of the output flow in a production line of an oil well are processed through a processing system of temperature, pressure, pressure drop signals (12).

In embodiments of the nuclear flowmeter for measurements in multiphase flows consisting of up to three main phases that is connected in series to a production line of an oil well according to the present invention, the processed data obtained from the neutron detectors through the system for signal conditioning and processing (11) and the data obtained in the processing system of the process, temperature, pressure, pressure drop signals (12) are analyzed through a signal processing system, with retransmission unit to a remote station and/or screen (13) in such a way as to obtain the composition of the three main phases of the production line in an oil well.

In a preferred embodiment of the nuclear flowmeter for measurements in multiphase flows consisting of up to three main phases that is connected in series to a production line in an oil well according to the present invention, it also includes a batteries bench of 12 volts to feed the signal conditioning and processing system (11), the processing system of process, temperature, pressure, pressure drop signals (12), and the processing system of the counting of neutrons and process signals, with retransmission unit to a remote station and/or screen (13).

In another preferred embodiment, the nuclear flowmeter for measurements in multiphase flows consisting of up to three main phases that is connected in series to a production line in an oil well according to what has been stated, the storage, shield and transport compartment of a neutron source (15) includes a fast neutron source (17) that includes Am—Be as active component, which is be sealed in stainless steel.

In the nuclear flowmeter for measurements in multiphase flows consisting of up to three main phases that is connected in series to a production line of an oil well according to above preferred embodiment, the storage, shield and transport compartment of the neutron source (15) includes a compartment cover (18) with its respective shield that allows the isolation of the fast neutron source (17) for its transport when the storage, shield and transport compartment of the neutron source (15) is decoupled from the aluminum/stainless steel support (19).

In said embodiment of the nuclear flowmeter for measurements in multiphase flows consisting of up to three main phases that is connected in series to a production line of an oil well the compartment cover (18) with its respective shield can be placed through external mechanical actuation.

In this preferred embodiment for the nuclear flowmeter for measurements in multiphase flows consisting of up to three main phases that is connected in series to a production line of an oil well, the "fast" neutron source (17) that includes Am—Be as an active component can be placed in an optimum position for the neutron measurement and counting through external mechanical actuation (16) applied to it.

In the nuclear flowmeter for measurements in multiphase flows consisting of up to three main phases that is connected in series to a production line of an oil well according to all the preferred embodiments, it is supported in a support structure built in carbon steel profiles (20).

In said embodiments of the nuclear flowmeter for measurements in multiphase flows consisting of up to three main phases that is connected in series to a production line of an oil well the discrimination principle between the constituent phases (water, oil and/or gas) falls over the moderation of the neutrons that is produced within the conduct (5).

In all the embodiments of the nuclear flowmeter for measurements in multiphase flows consisting of up to three main phases that is connected in series to a production line of an oil well, the neutron detection is produced in two differentiated energetic ranges; named "thermal" or "CR2" and "fast" or "CR1", with the purpose of discriminating the volumetric sector occupied by the gas and the water cut of the liquid phase.

In other preferred embodiments the nuclear flowmeter for measurements in multiphase flows consisting of up to three main phases that is connected in series to a production line of an oil well according to the present invention, an exclusive cavity can be incorporated to store a sample of the liquid phase (31) extracted from the adjacent fluid through a "Pitot" type tube for the income of the sampling fluid (30), a liquid/gas separator (22) and a manifold of separated liquids (23); within said cavity (31) the gaseous phase has been separated and the liquid is injected, that is radiated with the same source (17).

In the nuclear flowmeter for measurements in multiphase flows consisting of up to three main phases that is connected in series to a production line of an oil well according to a production line of an oil well according to the former embodiment, a liquid sample formed by water/oil included in the exclusive cavity for the storage of a sample of the liquid phase (31) is radiated with neutrons of the source (17), for the later identification of the Gamma photons produced from the activation by neutron capture of the present oxygen nuclei.

In the nuclear flowmeter for measurements in multiphase flows consisting of up to three main phases that is connected in series to a production line of an oil well according to the above preferred embodiments, the water cut for gas fractions above 50% is determined using the activation by neutron capture within the dedicated chamber (31) that is radiated with the source (17) in parallel with the pipe sector designed for the nuclear measurement (5).

In said nuclear flowmeter for measurements in multiphase flows consisting of up to three main phases that is connected in series to a production line of an oil well, the water cut for gas fractions below 50% is determined using the readout of the neutron detectors that are sensitive to the "slow" and "fast" neutrons, without the need of using the measurements of the chamber (31).

In the nuclear flowmeter for measurements in multiphase flows consisting of up to three main phases that is connected in series to a production line of an oil well according to all the preferred embodiments, the determination of the mass and volumetric flow, total and partial, of each phase, is calculated in a processing system of the neutrons counting and process signs (13) from the interpretation as a whole of the process data (temperature, pressure) with temperature and pressure sensors with their respective transducers (7), the differential pressure transducer data (10) by pressure drop in Venturi sector (3) and the readouts of the radiation detectors (8).

In the nuclear flowmeter for measurements in multiphase flows consisting of up to three main phases that is connected in series to a production line of an oil well according to the above preferred embodiment, the incorporated computer (13) receives and interprets the data generated by the system for signal conditioning and processing (11) and the processing system of process, temperature, pressure, pressure drop signals (12); compares them against previously charged values, processes them according to the programmed algorithm and generates the mass flow values W, total volumetric flow QTOT, partial volumetric flows, water cut CA and gas fraction FG, where the computer (13) has the capacity to store and/or retransmit the data to a central monitoring station.

BRIEF DESCRIPTION OF THE DRAWINGS

For a better understanding of this description, a series of drawings are annexed wherein the main components are schematized as well as the spatial arrangement of the flowmeter for measurements in multiphase flows of the present invention. They are submitted by way of example of a particular setting, but do not exhaust the possibilities of the fundamental concept of the invention.

The main body of the device is formed by a carbon steel pipe section (built according to regulation API or ASME, as applicable) through which the flow to the characterized circulates.

FIGS. 3 and 4: detail a radioactive shielding and assembly system of the neutron source. It should be noted that the neutron source does not constitute the purpose of the present invention, but is an additional component.

REFERENCE NUMBERS OF THE DRAWINGS

Figure 1:
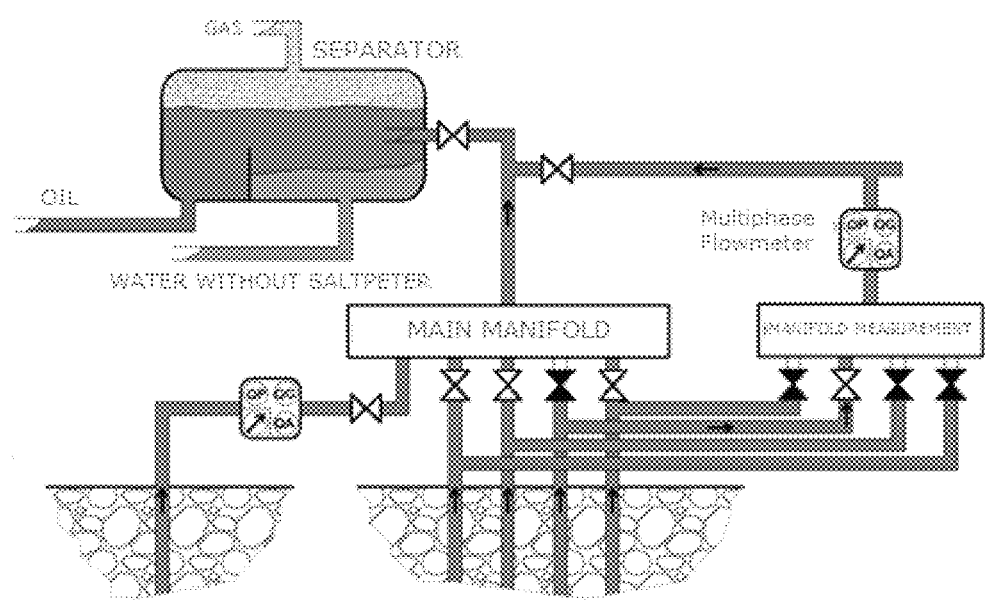
FIG. 1: wells and manifolds scheme typically used in the oil production on site. A possible configuration to use the multiphase flowmeter is offered: either dedicated to a single well (due to its production volume) or connected to a manifold to characterize a set of wells.

1. Input pipe section for connection with the production line.
2. Multiphase flow to be measured.
3. Pipe section with section reduction for "Venturi".
4. Elbow for flow direction change.
5. Pipe section designed for the nuclear measurement.
6. Acoustic and thermal isolation for radiation detectors.
7. Temperature and pressure sensors with their respective transducers.
8. Neutrons detectors, with their respective supports. They can be of two types, to detect slow neutrons (CR2) and/or fast neutrons (CR1).
9. Output connectors of the neutron detectors.
10. Differential pressure transducers.
11. Electronic system for signal conditioning and processing from the neutrons detectors. Stages of pulse constitution, amplification and discrimination; subsequent counting and register thereof.
12. Processing system of process, temperature, pressure, pressure drop signals.
13. Processing systems of neutrons counting and process signals, with the corresponding processing algorithm, with retransmission unit to a remote station and/or screen.
14. 12 v. direct current batteries bench for electronic equipment feeding.
15. Compartment for storage, shield (mainly for neutron moderation) and transport of the neutron source.
16. Mechanical actuation for positioning the neutrons source outside the shield.
17. "Fast" neutrons source, Am—Be active component, sealed in stainless steel.
18. Compartment cover (15), with its respective shield and external actuation.
19. Aluminum/stainless steel support for accommodation of the source (17) in its standard operation position.
20. Support structure for the device, built in carbon steel profiles.
21. Multiphase flow at the output of the measurement.
22. On line liquid/gas separator, based on centrifugal effect. The separation method may vary.
23. Manifold of separated liquids.
24. Thermal conditioning chamber for the separated liquids.
25. Sampling gases venting unit.
26. Fast coupling for sampling pipe union.
27. Valve with actuation.
28. Liquid samples storage unit, with thermal conditioning capacity.
29. "Pitot" type tube, for reinjection of liquid extracted from the sample collection system.
30. "Pitot" type tube for input of sampling fluid (system of up to three phases).
31. Chamber to accommodate liquids extracted from the sample collection system while radiated by the neutrons source 17, in operation position.
32. Conduct to transport the separated liquid in (22) until the radiation chamber (31).
33. Flanges for connection between pipe sections.
34. Photodetector and photomultiplier for collection of photons issued in the chamber (31).
35. Gamma photons detector, for example, of NaI.
36. Connector that carried de detector signal (35) towards the computer.

DETAILED DESCRIPTION OF THE INVENTION

According to the above explained purposes, the present invention consists in a pipe section built to support the pressure, temperature and corrosive environment conditions typical of the oil industry; which is connected through flanges with the sections of the production line (provided by the user) through the income pipe sector to make the connection with the production line (1).

In FIG. 1, a possible connection and use scheme of the present flowmeter is shown: connecting a device to a well exclusively or to a manifold that allows exchanging the readout from one well to another.

Figure 2:
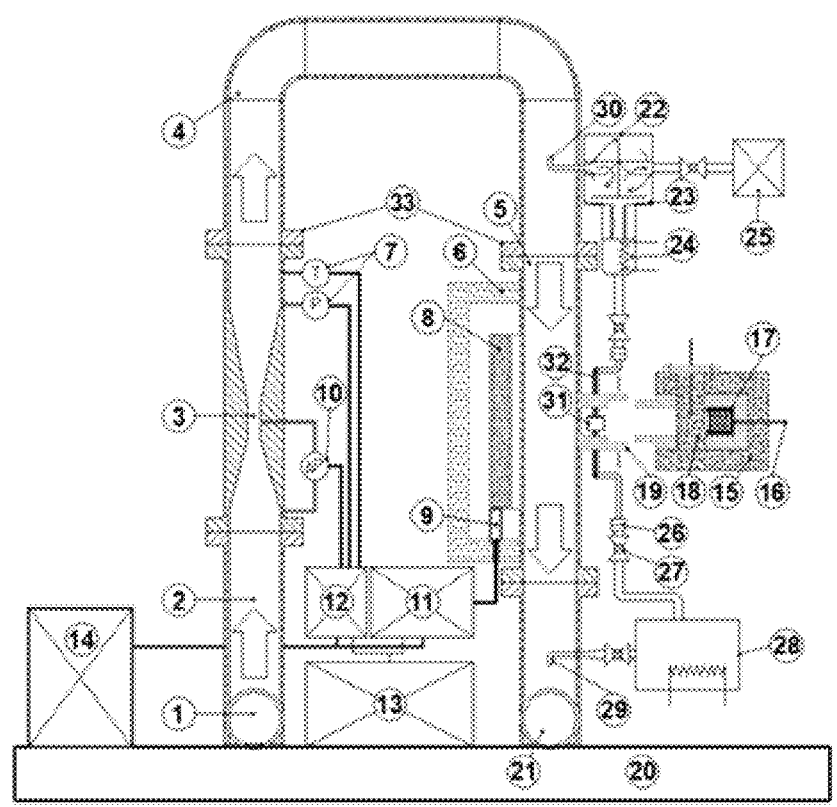
FIG. 2: a sectional schematic view of the present nuclear flowmeter is shown, wherein the supports of some components were omitted for simplicity purposes.

In FIG. 2 there is a complete scheme of the invention. Two clearly distinguishable areas can be seen, the first one where the pressure drop localized with a "Venturi" identified as (3) is carried out and the second for the nuclear measurements (5) connected by a horizontal section through the elbows (4) or "T" type unions (according to the constructive convenience).

The process data gathering is done through one or two thermocouples mounted on the body of the pipe (for temperature) as well as of a gauge pressure sensor (7). The pressure drop due to the reduction of the transversal section of the "Venturi" is registered with the differential pressure transducer (10). With this information the total volumetric flow that circulates through the device can be known.

The following section is reserved for the necessary nuclear measurements and assemblies. The conduct section is reduced once again up to a diameter that is optimal for the interaction of the neutrons with the fluids in the pipe section designed for the nuclear measurement (5). In FIG. 2 a reduction is omitted for simplicity. The set of neutrons detectors (8) and the support for neutron source (19) are placed in the periphery of this pipe section. In FIG. 2 they are showed facing each other, however, the relative position between both components may be modified as required and with the purpose of maximizing the intensity of the signal readout by the set of neutrons detectors (8).

The support (19) has the function of accommodating the neutron source (17) during the standard operation of the device. It is coupled with the storage compartment (15) to receive the fast neutrons source (17) once this compartment is opened with the barrier (18). The building of the support (19) can be made both in carbon steel and in aluminum.

The container of the neutrons source in the storage compartment (15) is intended for the storage of the source at the same time that it provides shield for the protection of the operator and close public, for that reason it is built of highly hydrogenated material (borated paraffin) plated in aluminum/steel.

The neutrons detectors (8) are supported to the conduct destined to the nuclear measurement (5) by a structure of carbon steel and/or aluminum, which shall also accommodate the acoustic and thermal isolation (6). The connectors (9) are placed within the acoustic and thermal isolation for the radiation detectors (6).

The signal retransmission and processing modules that include the electronic system for signal conditioning and processing, the processing system of the process signals and the processing system of the neutron counting and process signals (11), (12) and (13) consist of boxes sealed to protect the inside of the electronic from the climatic conditions of the environment. This implies, avoiding the incoming of particles and providing a suitable inner temperature (avoid freezing, overheating, etc.). Its location must be near the invention, being the representation of FIG. 2 an attempted position for said components. Module (11) corresponding to the electronic system for signal conditioning and processing from the neutrons detectors contains the electronic components to operate the neutrons detectors (8) (high voltage source, pulse forming stages, etc.). Module (12) corresponding to the processing system of the process signals (temperature, pressure, pressure drop) collects the analogic signals of the temperature and gauge pressure transducers of the sensors (7) and of the transducer of differential pressure (10). The computer of the flowmeter is placed in the processing system of the neutrons counting and process signals (13); in which inner memory the data tables previously charged and the calculation algorithm that generates the exit signals are stored. At the same time, said system (13) also includes the data retransmission module.

The electric supply is made through one or more batteries of direct current (14), placed following the electronics corresponding to the systems (11), (12) and (13) and with the same precautions to avoid freezing due to environmental conditions.

The whole set is linked by a mechanical structure (20) corresponding to the support structure for the device which purpose is to give structural integrity and support, for standard operation such as transfers.

The invention has a liquid/gases separator on line (22) which purpose is to collect samples of the fluid, separate the liquid current and condition it in the thermal conditioning chamber for the separated liquids (24). Afterwards, it is transported through the conducts (32) up to a dedicated radiation chamber (chamber to accommodate liquids extracted from the sample collection system) (31); that is placed on one side of the source (17) when it is in operation position. The separated gas is vented through a venting unit of sampling gases (25) and the liquid returns to the line through the storage unit of liquid samples (28) and a "Pitot" type tube for reinjection of the liquid extracted from the sample collection system (29). The connections are made through fast couplings (26). A photodetector and photomultiplier (34) collects the photons issued in the chamber to accommodate the extracted liquids (31) so that they are captured by the detector (35) and transmitted to the computer (13) through the connector (36).

The purpose of the described invention is to measure multiphase fluid flows, consisting mainly of oil, water and gas; directed to the installation in oil "wellheads".

The body of the flowmeter is formed of carbon steel pipe, in which the fluid to be measured (2) enters through (1) and returns to the main line through (21). The mentioned device receives the fluid in (1), transports it to a Venturi type reduction section (3) through a "T" type connection. The nuclear measurements are carried out in a vertical sector of the conduct (5) connected to (3) through a horizontal section of the pipe. The outcome of the fluid takes place through (21). See FIG. 2. The link of (3) and (5) with the rest of the pipe is achieved through flanges (33) so that this way it allows the replacement of said pieces. In particular, (5) shall be exposed to a radiation field for long periods which can generate a radioactive activity level in the same conduct. For said reason, it has been foreseen to replace the section (5) after a pre-fixed amount of hours of service to prevent that certain activity levels are exceeded.

Figure 3:
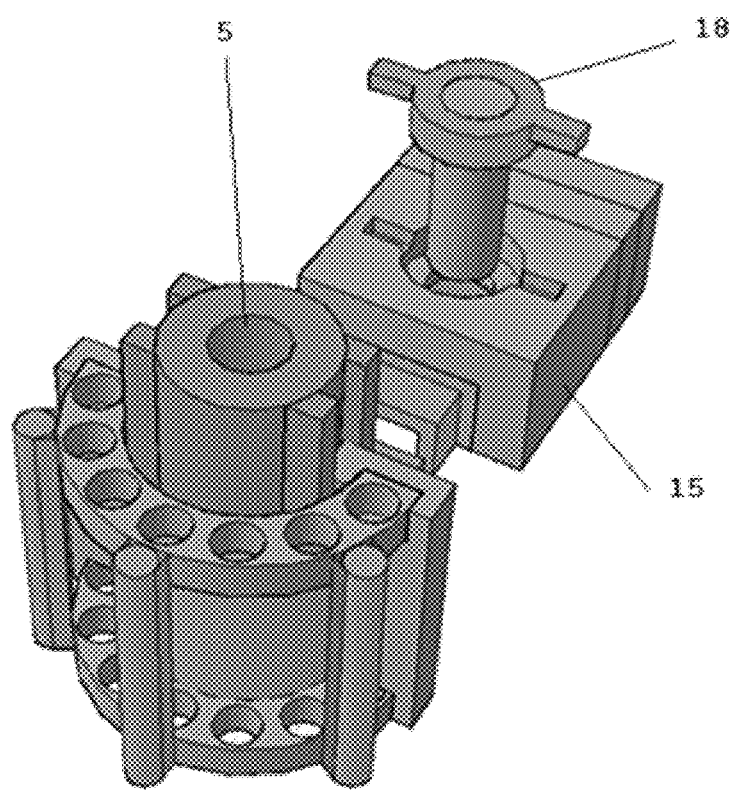
FIG. 3: an isometric view of the same scheme is included.
Figure 4:
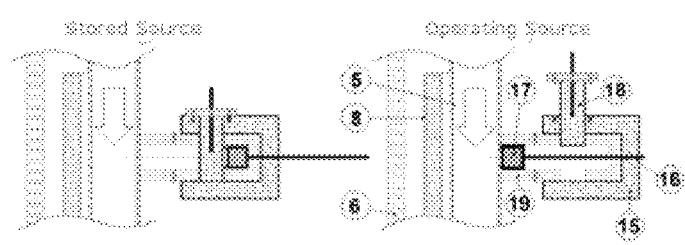
Figure 4:
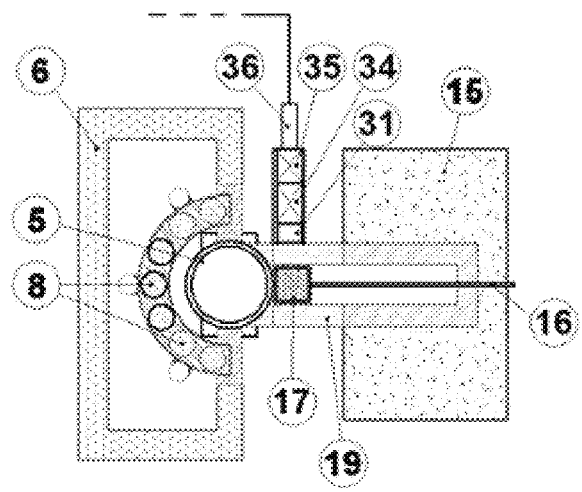
Figure 5:
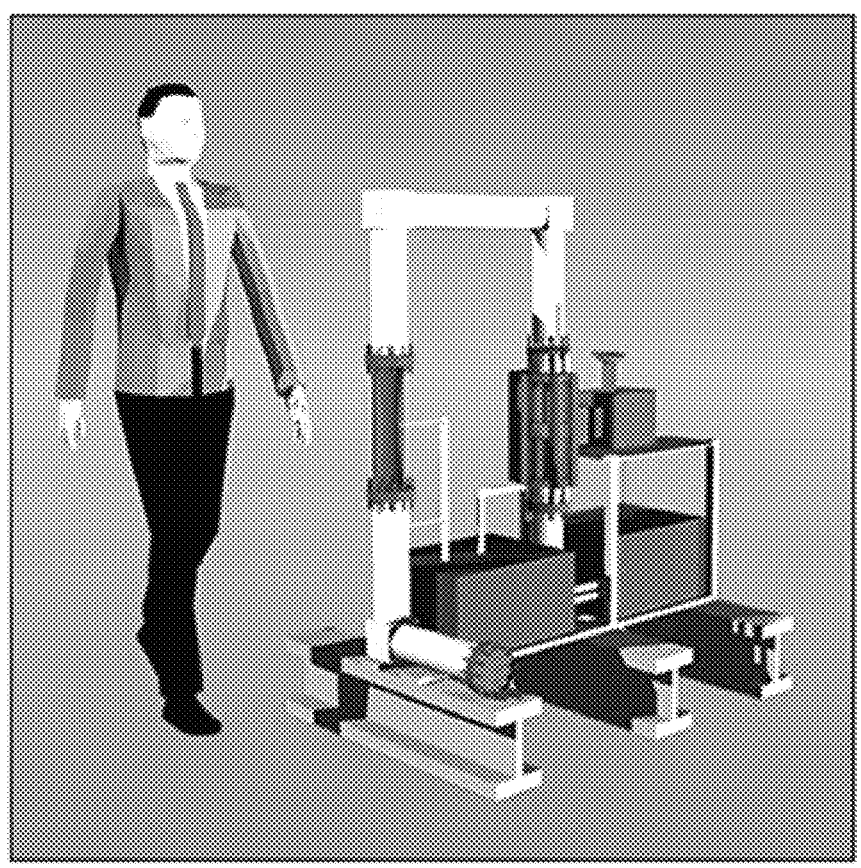
FIG. 5: shows an arrangement of the flowmeter of the invention where its size is shown with regard to a person of average height.
Figure 6:
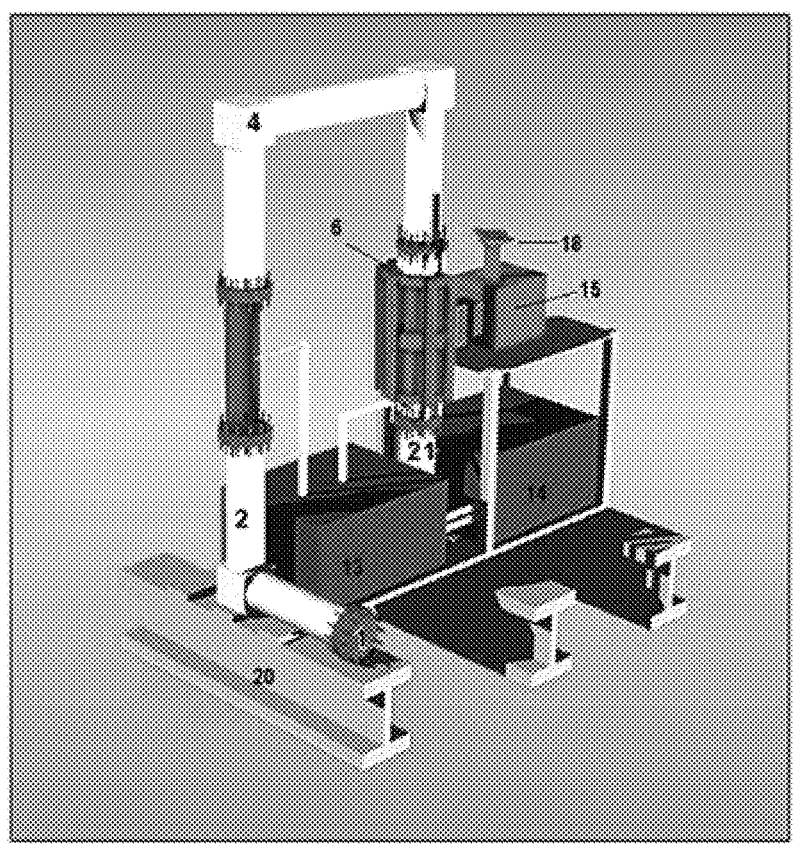
FIG. 6: shows the same arrangement of the prior figure with the indication of the constituent parts.

To solve the problem of the discrimination between phases, it uses a neutrons issuance source, portable, sealed and of low voltage (17). Said source has an active volume consisting of a metallic mixture between Americium and Beryllium. The active element if Amerilium, which Am-241 isotope issues an "Alpha" particle. It impacts against the Beryllium nuclei and produces the neutrons that are finally issued outwards. It has a source-holder element with biologic shield (15) that allows the operators to work in the surroundings of the device without exceeding the allowed working dose. At the same time, it has an element that allows storing the source for its eventual transport (18) or either uncover it to occupy the operation position. See FIGS. 3 and 4. The source (17) and its shield (15) are engaged with the measuring conduct (5) through a coupling (19). Within the shield (15) space should be left for a radiation chamber (31).

The physical operation principle is called moderation of "fast" neutrons: as a consequence of the interactions of the neutrons with the nuclei of the constituent substances of the flow (mainly hydrogen, carbon and oxygen) a moderation in the kinetic energy of the issued particles is produced, reducing their speed. This change is measurable and has great sensitivity with regard to the content of the above mentioned elements. Consequently, the readout of the detectors (8) shall be a monotonous type function decreasing as the gas fraction increases.

Two fundamental parameters shall be solved, the water cut "CA" (water fraction regarding the total of the liquid phase: relation between the volume of the water phase with regards to the total of the liquid phase, range: 0.0 to 1.0) and gas fraction "FG" (ratio of gaseous phase regarding the total: relation between the volume of the gaseous phase with regards to the total, range: 0.0 to 1.0). Both parameters are obtained from registering the counting rate of "CR1" type neutrons (counting rate of neutrons associated to a "fast" energy group; in this case neutrons of more than 0.5 eV of kinetic energy) and/or "CR2" thermal (counting rate of neutrons associated to a "slow" energy group; in this case neutrons of less than 0.5 eV of kinetic energy) using appropriate neutron detectors (8). The detectors (8) shall be of at least of two distinguishable types; for example one group can be gaseous detectors of BF3 operated in proportional counting range (for "slow" neutrons or CR2) and the other group detectors of "proton recoil" type to measure the "fast" neutrons or CR1. The signals that are generated are configured, filtered and amplified by the specialized electronic that is summarized in module (11).

The slow counting "CR2" shall be associated with the gas fraction "FG": at higher volume occupied by the gas there is less material with which the radiation interacts and therefore reduces the counting in a monotonous manner. Said dependence for the offered system is known from computer simulations, which is a monotonous decreasing function as the one shown in FIGS. 8 and 9.

The computer (13) shall have the curves that relate CR2 with FG for different CA and conditions of temperature T and pressure P charged. Given a CR2 value, previously charged the algorithm looks for the FG value that corresponds.

The fast "CR1" counting (together with "CR2") shall be associated to estimates of the water cut "CA". The intensity of the neutrons field that passes through the conduct with kinetic energy greater than the cut of 0.5 eV depends in part on the water content in the liquid phase "CA". From computational simulations it can be observed that the fast counting CR1 is incremented as the CA increases, with an increasing monotonous relation (see FIG. 10).

The computer (13) shall have the curves that relate CR1 with CA for different FG and conditions of temperature T and pressure P (7) charged. Given a value of CR1 the previously charged algorithm looks for the CA value that corresponds.

Alternatively, the dedicated radiation chamber (31) can be used to reach a better resolution in the water cut CA. First, fluid is subtracted with a Pitot type tube (30), with an on line separator (22) the liquid phase is subtracted regarding the gas and pours it into (23) to (24). In the chamber (24) the liquid sample can de thermally conditioned. The separated gas is vented using (25). When sufficient liquid is collected, the computer (13) orders that it is poured over the radiation chamber (31). During a predetermined time the liquid contained in (31) is radiated by the neutrons issued by the source (17), the atoms nuclei of oxygen present fall into the following reaction:

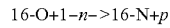

16-O+1-*n*->16-N+*p*

(the nucleus of oxygen captures the neutron, a nitrogen nucleus plus a proton is produced). Each nucleus of N-16 (Nitrogen 16) declines issuing a Gamma photon of specific energy. With a NaI type Gamma radiation detector (35), for example, the issued Gamma photons are counted. Said photons are previously collected by a photomultiplier (34), to be then transmitted by the connector (36) towards the processing electronic components (11). In the electronic system for signal conditioning and processing (11) a discrimination in energy is carried out to count the Gamma photons of the specific energy of decay associated to N-16. This generates the CR3 counting. Considering that the oxygen is mostly found in the water phase, there is a lineal type reply increasing between the CR3 counting and the water cut CA.

Figure 11:
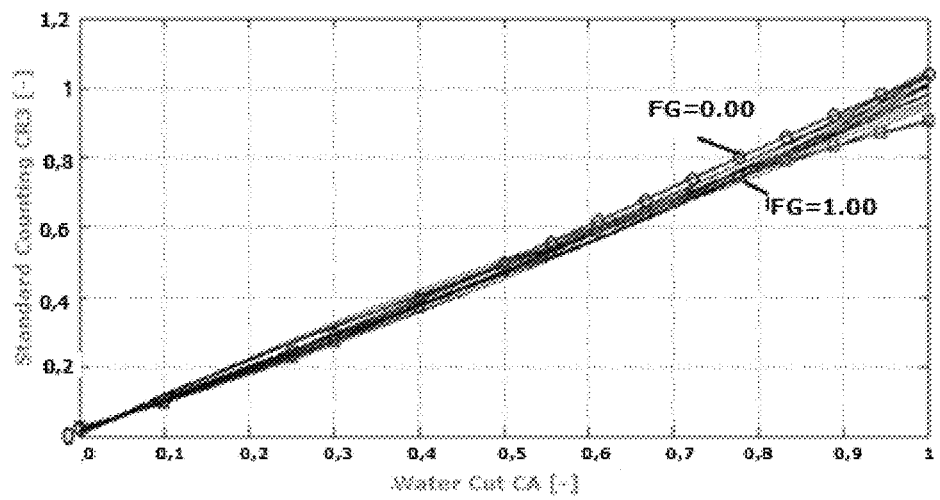
FIG. 11: curves families that relate the standard counting of Gamma CR3 photons with the water cut "CA", for different gas fractions "FG". The results were obtained through computational simulations based on "Monte Carlo" type codes.

In FIG. 11 the curve that relates CR3 with CA for all gas fractions FG possible within the conduct (5) is shown. Said straight lines weakly depend on the gas fraction FG. The computer (13) incorporated to the flowmeter shall have an algorithm that looks for said parameters based on the measured FG. Once this process is completed, the liquid contained in the chamber to accommodate the extracted liquids (31) returns to the main current through the "Pitot" type tube (29), prior to the passage by an intermediate chamber (28) where a thermal reconditioning of the sample can be made. Considering that the Nitrogen-16 has a half-life period smaller than 7.14 s, it is absolutely safe to reintroduce the sample to the current: on the one hand, due to the extremely low activity and, on the other, because it is decreased to 0.20% in less than 1.0 min (after 3 min. falls below 0.0001%, undetectable level).

Figure 7:
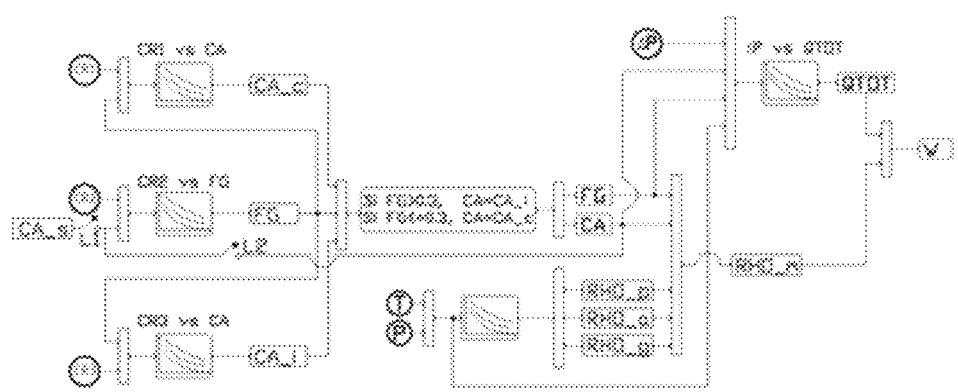
FIG. 7: flow chart that represents the signal processing algorithm. The "input" signals are: T, P, CR1, CR2, CR3, DP. The "output" signals are: W, QTOT, FG and CA. The charts that schematize the functions represent data tables with data previously charged in the computer of the device.

CA and FG parameters are calculated using the computer (13). The algorithm is of iterative type and is schematized in FIG. 7. One gas fraction from the CR2 is estimated for a "seed" water cut CA_s (FIG. 7, key L2 closed and L1 opened). After this, a decision is taken: if FG is smaller or the same as a cut value (estimated in FG=0.30) the CA_c is calculated using CR1 (counting of fast neutrons). On the contrary, if FG is bigger than 0.30, the readout CR3 is used (with the dedicated radiation chamber) obtaining CA_i. As the case may be, a water cut CA that replenishes the initial calculation of gas fraction FG is obtained (FIG. 7, key L2 opened and L1 closed). With this new value of FG, CA is evaluated again (with the corresponding means). The process is repeated until the relative difference between an iteration step and the following is smaller than 0.01% for FG and CA.

Therefore, based on the counting CR2, CR2 and/or CR3 the parameters CA and FG are obtained that allow the knowledge of the average density RHO_m of the mixture:

$$RHO\_m=FG*RHO\_g+(1-FG)*[CA*RHO\_a+(1-CA)*RHO\_p]$$

Figure 12:
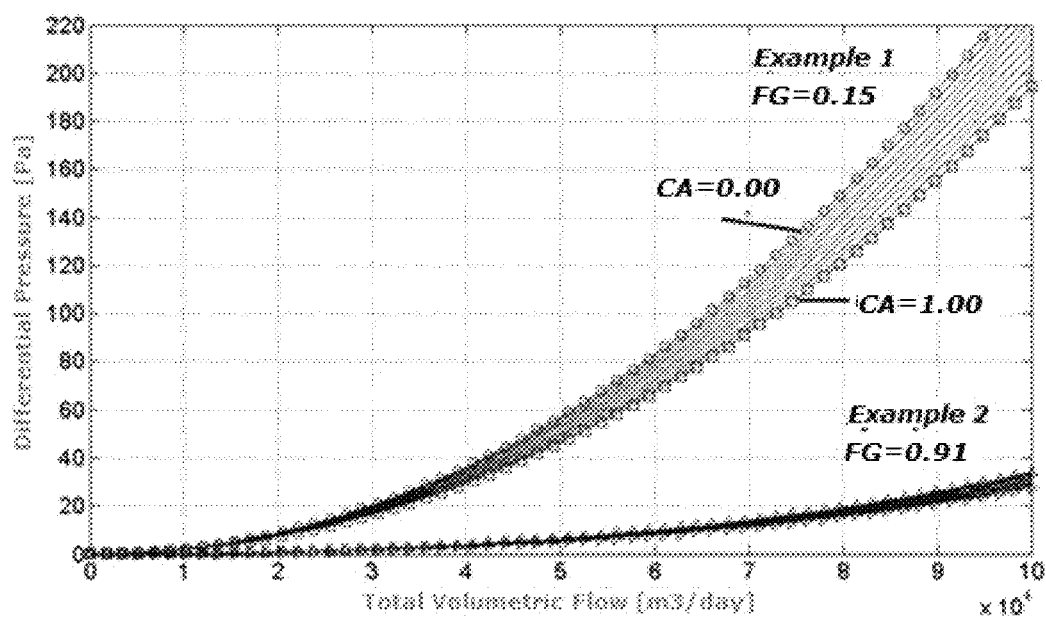
FIG. 12: curves families that relate the differential pressure DP measured in the Venturi type section with the total volumetric flow "QTOT", for different gas fractions FG and water cuts "CA". The results were obtained through computational simulations of the hydraulic system.

The flow measurement is completed measuring the pressure drop "DP" readout by the transducer (10), due to the "Venturi" section (3)—units: [Pa]. The total volumetric flow "QTOT" (units: [m3/day]) is obtained from the comparison of DP with table values previously charged in the computer (13); which are function of FG, CA, P and T. Typically, it is an approximately lineal relation between the flow square (QTOT^2) and DP. In FIG. 12 the relation between DP and QTOT is shown for different values of FG and CA. The Venturi geometry is implied in the values charged in the computer 13.

This model is valid in view of the fact that the Venturi arrangement in vertical sense, in the proximity to a "T" connection, causes that the relative speed between the phases is null and therefore the flow behaves in a manner similar to a "homogeneous" speed flow.

In FIG. 7, the flow chart is summarized with the main operations to be made with the signals The outcome signals make it possible to obtain the total mass flow W and from CA, FG and RHO_m the following parameters are calculated:

$$QTOT=W/RHO\_m*86400[m3/day]$$

$$QG=FG*QTOT[m3/day]$$

$$QA=(1-FG)*CA*QTOT[m3/day]$$

$$QP=(1-FG)*(1-CA)*QTOT[m3/day]$$

The main purpose of the invention lies on the use of a neutrons portable source (17) to generate the CR1, CR2 and CR3 counting; in order to calculate the water cut and gas fraction (CA and FG) and together with the readout of DP calculate the total mass flow W, total volumetric flow QTOT (units: [m3/day] or [m3/h] as well as partial QP (volumetric flow of oil; units: [m3/day]), QA (volumetric flow of water; units: [m3/day]) and QG (volumetric flow of gas; units: [m3/day]) for regular intervals of time. As a minimum it is foreseen to have measurements every 3 min. (180 s) or according to the user request.

The necessary algebraic operations, access to data bases previously entered and processing of the information shall be done through a computer installed within the device corresponding to the processing system of the neutron counting and process signals (13). It may keep registrations of the data generated as well as retransmit them according to the operator necessities.

The electronic systems are feed as a whole from a portable energy source through a direct current battery (14). It is incorporated to the set supported by the support structure (20). The support structure (20) has the sufficient rigidity for links that allow the transport of the complete equipment.

EXAMPLES

Example 1

A flowmeter as the one shown in FIG. 1 was considered, which pipe diameter is 3, having a reduction to 2.75 in the Venturi section. The instruments take the following readouts:

Absolute pressure of flow: 5 (bar)
Fluid temperature: 80 (° C.)
Pressure drop in the Venturi section: DP=51.5 (Pa)
Fast counting of neutrons: CR1=22.12 (1/s)
Slow counting of neutrons: CR2=608.05 (1/s)

Using temperature and pressure data, the densities of each constituent phase are obtained from the interpolation of the tables available in the computer:

$$RHO\_a=971.9 kg/m3;$$

$$RHO\_q=2.73 kg/m3 \text{ (real gas sample)};$$

$$RHO\_p=800 kg/m3;$$

On the basis of a seed water cut CA_s=0.95 the corresponding curve of FIG. 7 is used, that relates the CR2 with FG. Considering the CR2=608.05 the computer (13) can operate directly with CR1 without readout of the radiation chamber (31) since FG shall be bigger than 0.30 (see FIG. 7). The computer executes the iterative algorithm to calculate the corresponding FG and CA based on the curves shown in FIGS. 7 and 9. The results are:

$$FG=0.15$$

$$CA=0.89$$

Afterwards, the average density of the RHOM mixture is calculated based on CA and FG.

$$RHOM=[0.89\times971.9+(1-0.89)\times800.0]\times(1-0.15)+2.7\times0.15=810.45 kg/m3$$

Using the DP vs. Q curve for a specific CA and FG, the mass flow can be calculated depending on the measured DP (pressure drop). In FIG. 11 the curve corresponding to different water cuts CA for a FG=0.15 is shown (as can be seen in FIG. 11 there exists a dependence with the CA and FG of the mixture). Entering with CA=0.89:

$$DP=51.5 [Pa]->QTOT=49,620.0[m3/day]$$

Making the necessary conversions, the following flow values result:

$$W=465.4[kg/s]$$

$$QP=4,639.5[m3/day]$$

$$QA=37,537.5[m3/day]$$

$$QG=7,443.0[m3/day]@5 \text{ bar},80° C.$$

In conditions of 1.01 bar (1.0 atm) and 15° C.: RHO_q=0.67 and the computer calculates the QGN flow of gas:

$$QGN=30,331.9[m3/day]$$

Example 2

A flowmeter as the one shown in FIG. 1 was considered, which pipe diameter is 3", having a reduction to 2.75" in the Venturi section. The instruments take the following readouts:

Absolute pressure of flow 2.5 (bar)
Fluid temperature: 55 (° C.)
Pressure drop in the Venturi sector: DP=19.0 (Pa)
Slow counting of neutrons: CR1=7.02 (1/s)
Normal counting of Gamma photons: CR3=0.5297

Figure 8:
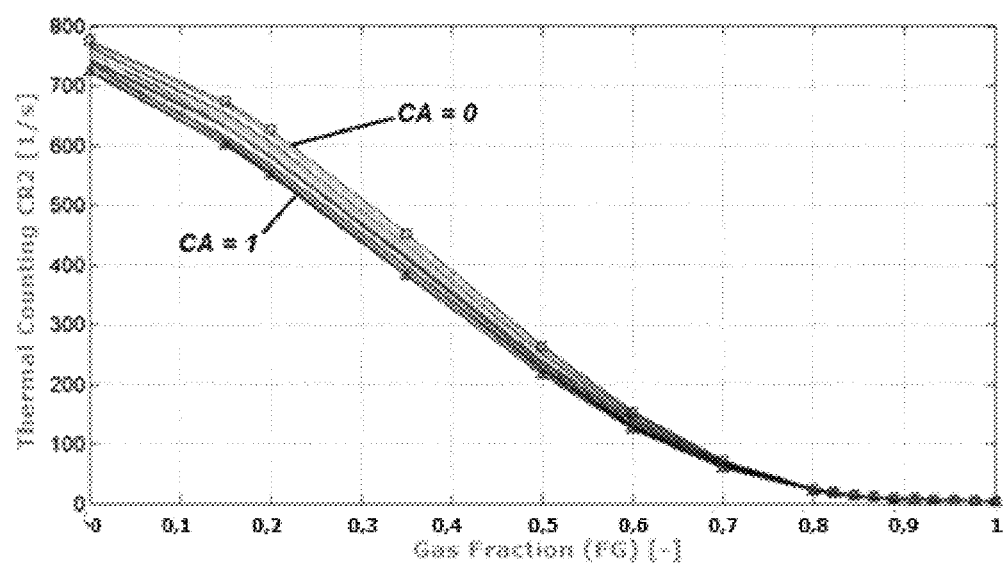
FIG. 8: curves families that relate the slow counting CR2 with the gas fraction "FG", for different water cuts "CA". The results were obtained through computational simulations based on Monte Carlo type codes.
Figure 9:
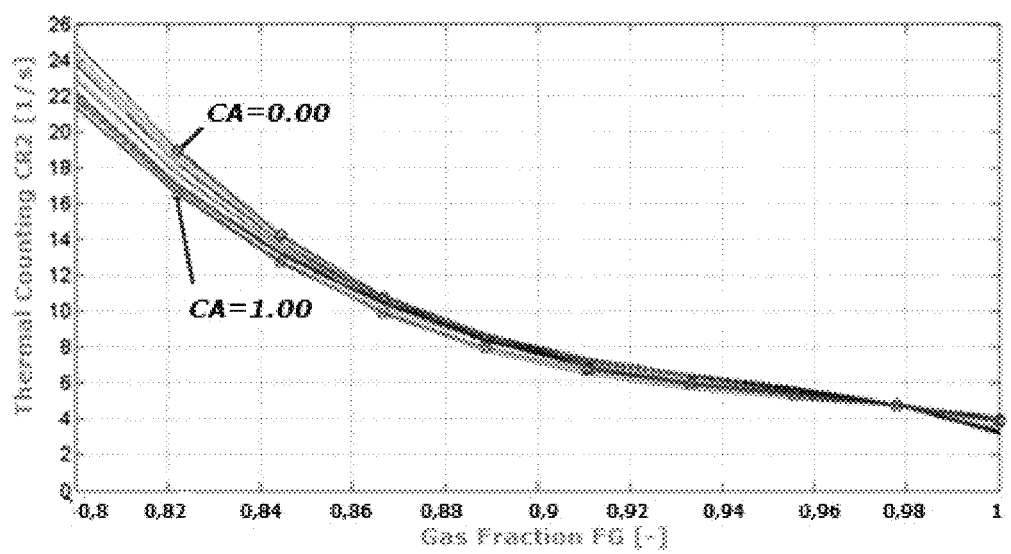
FIG. 9: approach of FIG. 8, with curves families that relate the slow counting CR2 with the gas fraction "FG" exceeding 0.80; for different water cuts "CA".

Using the relation of FIG. 8, a first estimate of FG is obtained with the CR2 counting. It is clear that regardless of CA, it will be a FG above 0.8 and it is necessary to use the radiation chamber.

Figure 10:
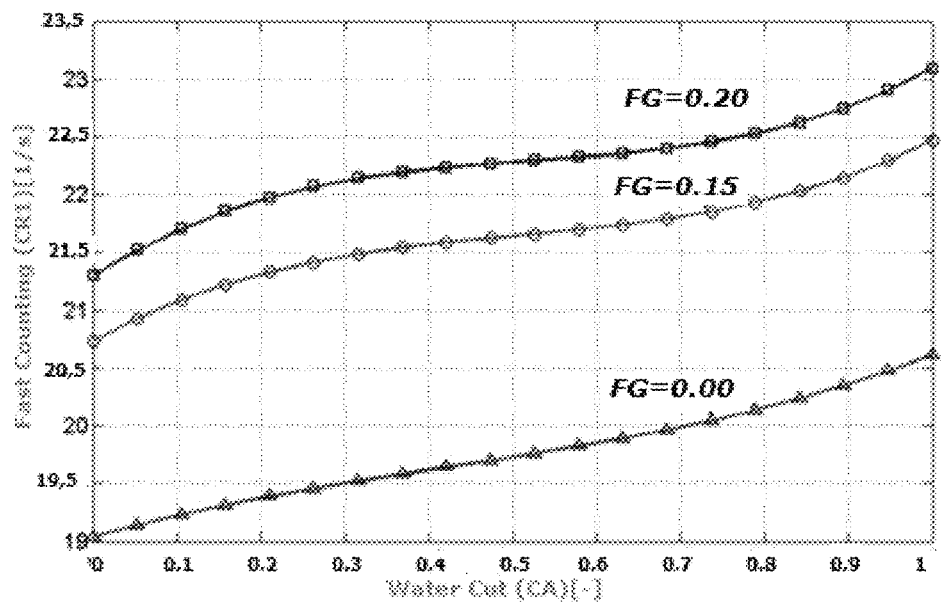
FIG. 10: curves families that relate the fast counting CR1 with the water cut "CA", for different gas fractions "FG". The results were obtained through computational simulations based on Monte Carlo type codes.

With the counting of the dedicated radiation chamber, CR3=0.5297 it is known that the water cut is CA=0.55 since FIG. 10. After this, it returns to FIG. 8 and the curve corresponding to CA=0.55 is used. It follows that FG=0.91.

With pressure and temperature data, the computer calculates the densities comparing/interpolating with its database:

$$RHO\_a=985.8[kg/m3];$$

$$RHO\_g=1.47[kg/m3] \text{ (real gas sample)};$$

$$RHO\_p=811.0[kg/m3];$$

Then it calculates RHOM:

$$RHOM=[0.55\times985.8+(1-0.55)\times811.0]\times(1-0.91)+1.47\times0.91=83.0[kg/m3]$$

Using the DP vs. Q curve for specific CA and FG the mass flow can be calculated depending on the measured DP (pressure drop). In FIG. 11 the curve corresponding to different water cuts CA is shown, now for a FG=0.91. Entering with CA=0.55:

$$DP=19.0 [Pa]->QTOT=82,220.0[m3/day]$$

Making the necessary conversions, the following flow values result:

$W = 79.0 [kg/s]$ $QP = 3,330 [m3/day]$ $QA = 4,070 [m3/day]$ $QG = 74,820 [m3/day] @ 2$ bar and $55°$ C.

In conditions of 1.01 bar (1.0 atm) and 15° C.: RHO_q=0.67 (Kg/m3) QGN is calculated:

$QGN = 163,960 [m3/day]$

CONCLUSION

The present invention consists of a flowmeter for measurements of multiphase flows, based on neutron interrogation techniques in combination with the collection of samples on line for its subsequent radiation "in situ". The invention is directed to the oil and gas industry, its purpose is to provide readouts in real time of the total mass and/or volumetric flow that circulates through the conduct as well as the gas fraction and water cut that characterizes it.

The concept of the flowmeter falls over the use of a neutron isotopic source that issues on an ongoing basis and is placed in the vicinity of a specific pipe section that constitutes the main body of the flowmeter. The device is installed in series with a production line, the fluid under production circulating within it. For that reason, the body of the flowmeter consists of a carbon steel pipe section built according to the corresponding industry regulations. The neutrons issued by the source suffer a collision process within the conduct wherein the fluid circulates (of up to three phases) and a series of specific detectors collect the signals so that they are subsequently interpreted and compared with the values charged in a computer.

The flowmeter has the capacity of distinguishing between the gas fractions and of taking the decision of collecting fluid samples, separating the liquid phase from the gaseous phase in order to radiate it within a special cavity. The radiation is carried out with the same neutron source.

The containment system of the source, its shield and capacity to be uncovered for its operation is part of the present invention. At the same time, the processing algorithm that is charged in the computer of the flowmeter also forms part of the present invention.

The readouts of the flow can be calculated thanks to a specifically designed Venturi type section. It responds to the recommendations of open bibliography and the current state of the art.

The invention claimed is:

1. A nuclear flowmeter for measurements in multiphase flows comprising up to three main phases that are connected in series to a production line of an oil well, where the pipe section of the output branch is placed between a storage, shield and transport compartment of an isotopic "fast" neutron source that includes said isotopic "fast" neutron source and neutron detectors included in the respective supports.

2. The nuclear flowmeter for measurements in multiphase flows comprising up to three main phases that are connected in series in the outcome flow of a production line of an oil well, according to claim 1, having a "U" shaped arrangement formed by an input branch and an output branch placed at both sides of the "U" shaped arrangement, where the input branch is connected to the production line of the oil well through an input pipe section and the output branch is connected to the line of production of the oil well through an output pipe section placed respectively at both ends of the "U" shaped arrangement; the input branch includes a pipe section with section reduction that forms a Venturi while in the output branch includes a pipe section with possible section reduction where the nuclear measurements are made.

3. The nuclear flowmeter for measurements in multiphase flows comprising up to three main phases that are connected in series to a production line of an oil well, according to claim 1, wherein the input branch includes temperature and pressure sensors with corresponding transducers and a differential pressure transducer to recollect pressure temperature and output flow pressure drop data of a production line of an oil well.

4. The nuclear flowmeter for measurements in multiphase flows comprising up to three main phases that are connected in series to a production line of an oil well, according to claim 1, wherein the storage, shield and transport compartment of the neutron source is externally coupled to the pipe sector with section reduction of the output branch through an aluminum/stainless steel support that allows the accommodation of said neutron source in its normal operation position.

5. The nuclear flowmeter for measurements in multiphase flows comprising up to three main phases that are connected in series to a production line of an oil well, according to claim 4, wherein said neutron detectors are included in respective supports and are isolated through acoustic and thermal isolation.

6. The nuclear flowmeter for measurements in multiphase flows comprising up to three main phases that are connected in series to a production line of an oil well according to claim 5, wherein said neutron detectors are included in respective supports and are isolated through said acoustic and thermal isolation and are connected to a signal conditioning and processing system through output connectors thereof which allows for signal conditioning and processing.

7. The nuclear flowmeter for measurements in multiphase flows comprising up to three main phases that are connected in series to a production line of an oil well, according to claim 1, wherein data of pressure temperature and pressure drop of the output flow in a production line of an oil well are processed through a processing system of temperature, pressure, and pressure drop signals.

8. The nuclear flowmeter for measurements in multiphase flows comprising up to three main phases that are connected in series to a production line of an oil well, according to claim 1, wherein processed data are obtained in the neutron detectors through the system for signal conditioning and processing and the data obtained in the processing system of the process, temperature, pressure, pressure drop signals are analyzed through a signal processing system, with a retransmission unit to a remote station and/or screen in such a way as to obtain the composition of the three main phases of the production line in an oil well.

9. The nuclear flowmeter for measurements in multiphase flows comprising up to three main phases that are connected in series to a production line of an oil well, according to claim 1, having a battery bench of 12 volts to feed the signal conditioning and processing system, the processing system of process, temperature, pressure, pressure drop signals, and the processing system of the neutrons counting and process signals, with retransmission unit to a remote station and/or screen.

10. The nuclear flowmeter for measurements in multiphase flows comprising up to three main phases that are connected in series to a production line of an oil well, according to claim 1, wherein the storage, shield and transport compartment of the neutron source includes a "fast" neutron source that includes Am—Be as active component, which is sealed in stainless steel.

11. The nuclear flowmeter for measurements in multiphase flows comprising up to three main phases that are connected in series to a production line of an oil well, according to claim 10, wherein the storage, shield and transport compartment of the neutron source includes a compartment cover with its respective shield that allows the isolation of the "fast" neutron source for its transport when the storage, shield and transport compartment of the neutron source is decoupled from the aluminum/stainless steel support.

12. The nuclear flowmeter for measurements in multiphase flows comprising up to three main phases that are connected in series to a production line of an oil well, according to claim 11, wherein the compartment cover with its respective shield for the "fast" neutron source that includes Am—Be as an active component is placed in position for the neutron measurement and counting through external mechanical actuation applied to it.

13. The nuclear flowmeter for measurements in multiphase flows comprising up to three main phases that are connected in series to a production line of an oil well, according to claim 1, wherein said nuclear flowmeter is supported by a structure comprising carbon steel profiles.

14. A nuclear flowmeter for measurements in multiphase flows comprising up to three main phases that are connected in series to a production line of an oil well, having a discrimination principle between the constituent phases (water, oil and/or gas) which falls over the moderation of the neutrons that is produced within the conduct,
wherein neutron detection is produced in two differentiated energetic ranges; named "thermal" or "CR2" and "fast" or "CR1", with the purpose of discriminating the volumetric sector occupied by the gas (FG) and the water cut (CA) of the liquid phase;
wherein the "thermal" neutron population CR2 is a decreasing linear function with the gas fraction FG for a given water cut CA;
wherein the "fast" neutrons CR1 population decreases linearly with the water cut CA for a given gas fraction FG; and wherein
the determination of CA and FG is reduced to solve a linear system of two equations with two unknowns being CR1, CR2 and the linear adjustment coefficients the input data.

15. The nuclear flowmeter for measurements in multiphase flows comprising up to three main phases that are connected in series to a production line of an oil well, according to claim 14, having an incorporated computer which performs the calculations of FG and CA according to the readouts of CR1 and CR2, recovering the linear adjustment coefficients for each case according to the previously charged iterative algorithm.

16. The nuclear flowmeter for measurements in multiphase flows comprising up to three main phases that are connected in series to a production line of an oil well, according to claim 14, wherein a sensor registers the differential pressure drop DP in a "Venturi" section; wherein
the relation of the square root of DP is linear with the total mass flow W, and once the gas fraction FG and water cut CA in the liquid phase are provided, it calculates the mass flow W.

17. The nuclear flowmeter for measurements in multiphase flows comprising up to three main phases that are connected in series to a production line of an oil well, according to claim 14, having an incorporated computer which receives and interprets data generated by blocks (11) and (12), in other words: temperature, water cut CA, gas fraction FG and pressure drop in the "Venturi" section or DP, compares them against previously charged values, processes them according to a programmed algorithm and generates mass flow values W, total volumetric flow QTOT and partial volumetric flows wherein, said incorporated computer has the capacity to store and/or retransmit the data to a central monitoring station.

18. The nuclear flowmeter for measurements in multiphase flows comprising up to three main phases that are connected in series to a production line of an oil well, where an exclusive cavity is incorporated to store a sample of a liquid phase extracted from an adjacent fluid through (30, 22, 23) and where within said dedicated cavity a gaseous phase has been separated and a liquid is injected, consisting of water/oil included in said dedicated cavity, to be radiated by the same isotopic "fast" neutron source, for a subsequent detection of gamma photons produced by the decay of isotope N-16 as a result of the reaction O-16(n,p)N-16*; wherein N-16* is the exited nucleus of Nitrogen-16.

19. The nuclear flowmeter for measurements in multiphase flows comprising up to three main phases that are connected in series to a production line of an oil well, according to claim 18, wherein a water cut for gas fractions above 50% is determined using activation by neutron capture within the dedicated cavity that is radiated with the source in parallel with a sector, wherein for gas fractions below 50% it is determined using the readout of the neutron detectors that are sensitive to the "slow" and "fast" neutrons, without the need to use the measurements of the cavity.

20. The nuclear flowmeter for measurements in multiphase flows comprising up to three main phases that are connected in series to a production line of an oil well, according to claim 18, wherein a computer determines the necessity of making dedicated radiations in a cavity or by direct requirement of the user and wherein the CA value is used therefore to calculate the total volumetric and mass flow.

* * * * *